United States Patent [19]

Bednar

[11] Patent Number: 5,566,458
[45] Date of Patent: Oct. 22, 1996

[54] CLUTCH MECHANISM FOR RECIPROCATING SAWS

[75] Inventor: Thomas R. Bednar, Pewaukee, Wis.

[73] Assignee: Milwaukee Electric Tool Corporation, Brookfield, Wis.

[21] Appl. No.: 444,069

[22] Filed: May 18, 1995

Related U.S. Application Data

[63] Continuation-in-part of Ser. No. 354,518, Dec. 13, 1994, abandoned, which is a continuation-in-part of Ser. No. 354,560, Dec. 13, 1994, abandoned.

[51] Int. Cl.$^6$ .............................. B23D 49/10; F16D 7/02
[52] U.S. Cl. .............................. 30/392; 173/178; 464/36; 464/46; 192/56.55
[58] Field of Search ............................ 30/392, 393, 394; 464/46, 36; 173/176, 178; 192/56.55, 56.57, 56.6, 56.62

[56] References Cited

U.S. PATENT DOCUMENTS

| | | | |
|---|---|---|---|
| 1,744,976 | 1/1930 | Levedahl | 81/57.14 |
| 2,566,183 | 8/1951 | Forss . | |
| 2,639,737 | 5/1953 | Forsberg . | |
| 2,790,471 | 4/1957 | Graybill . | |
| 3,170,496 | 2/1965 | Kohler et al. . | |
| 3,454,059 | 7/1969 | Sindelar . | |
| 3,461,732 | 8/1969 | Gregory | 30/392 |
| 3,527,273 | 9/1970 | Falter . | |
| 3,657,813 | 4/1972 | Knight | 30/392 X |
| 3,681,940 | 8/1972 | Albrile | 464/46 X |
| 3,934,629 | 7/1976 | Boman . | |
| 3,937,036 | 2/1976 | Sauerwein | 173/178 X |
| 3,943,800 | 3/1976 | Lesner . | |
| 3,971,132 | 7/1976 | Griffles et al. | 30/393 |
| 4,006,785 | 2/1977 | Roll et al. | 173/178 |
| 4,114,270 | 9/1978 | Jansen-Herfeld et al. | 30/394 |
| 4,220,230 | 9/1980 | Hansen . | |
| 4,265,320 | 5/1981 | Tanaka et al. | 173/178 |
| 4,365,962 | 12/1982 | Regelsberger . | |
| 4,418,766 | 12/1983 | Grossmann | 173/13 |
| 4,436,163 | 3/1984 | Simpson | 173/117 |
| 4,448,098 | 5/1984 | Totsu | 81/467 |
| 4,448,261 | 5/1984 | Kousek et al. | 173/176 |
| 4,488,604 | 12/1984 | Whitehouse | 173/178 |
| 4,542,812 | 9/1985 | Westley | 464/46 X |
| 4,630,512 | 12/1986 | Durr | 81/475 |
| 4,655,103 | 4/1987 | Schreiber et al. | 173/178 X |
| 4,676,001 | 6/1987 | Wagner | 30/393 |
| 4,699,036 | 10/1987 | Henne | 30/392 X |
| 4,721,169 | 1/1988 | Nagasawa et al. | 173/178 |
| 4,776,406 | 10/1988 | Wanner | 173/18 |
| 4,776,442 | 10/1988 | Young | 464/46 X |
| 4,809,572 | 3/1989 | Sasaki | 81/429 |
| 4,901,610 | 2/1990 | Larson et al. | 81/473 |
| 4,967,888 | 11/1990 | Lippacher et al. | 192/56.5 |
| 4,976,164 | 12/1990 | Lentino | 30/393 X |
| 5,005,684 | 4/1991 | Fujii | 192/56.57 |
| 5,025,562 | 6/1991 | Palm | 30/392 |
| 5,050,307 | 9/1991 | Palm | 30/392 |
| 5,060,733 | 10/1991 | Kress | 173/178 |
| 5,079,844 | 1/1992 | Palm | 30/392 |
| 5,092,441 | 3/1992 | Fujii | 192/56.54 |
| 5,113,951 | 5/1992 | Houben et al. | 173/75 |
| 5,129,465 | 7/1992 | Rahm | 173/178 |
| 5,138,916 | 8/1992 | Seto et al. | 81/474 |

FOREIGN PATENT DOCUMENTS

| | | | |
|---|---|---|---|
| 1596408 | 8/1981 | Germany . | |
| 9301295 | 12/1993 | Germany . | |
| 2-139114 | 5/1990 | Japan | 30/392 |
| 635227 | 4/1950 | Switzerland . | |
| 2042973 | 10/1980 | United Kingdom . | |
| 2181693 | 4/1987 | United Kingdom . | |

Primary Examiner—Scott A. Smith
Assistant Examiner—Jay A. Stelacone
Attorney, Agent, or Firm—Michael, Best & Friedrich

[57] ABSTRACT

Disclosed herein is a reciprocating saw including a housing, a shaft rotatably mounted in the housing, a motor, a spindle reciprocally supported by the housing, a wobble plate mounted on the shaft and connected to the spindle and converting rotational motion to reciprocal motion, and a clutch drivingly connecting the motor to the shaft and providing slippage between the motor and the shaft if there is binding of the spindle.

14 Claims, 4 Drawing Sheets

5,566,458

CLUTCH MECHANISM FOR RECIPROCATING SAWS

This application is a continuation-in-part of U.S. patent applications Ser. No. 08/354,518, entitled "Reciprocating Saw Clutch", now abandoned, and Ser. No. 08/354,560, entitled "Drive Mechanism for Power Tool", now abandoned, both filed Dec. 13, 1994.

FIELD OF THE INVENTION

The invention relates to reciprocating saws.

BACKGROUND OF THE INVENTION

Reciprocating drive mechanisms are known in the art. See, for example, U.S. Pat. No. 5,050,307, issued to Palm on Sep. 24, 1991, U.S. Pat. No. 5,025,562, issued to Palm on Jun. 25, 1991, and U.S. Pat. No. 5,079,844, issued to Palm on Jan. 14, 1992, each of which is assigned to the assignee of the present invention, and is incorporated herein by reference.

Reciprocating drive mechanisms are found, for example, in reciprocating saws. Such reciprocating saws typically include a housing including a gear case, a motor in the housing having a motor shaft, a jackshaft mounted in the housing parallel to the motor shaft, and a gear and pinion connecting the motor shaft to the jackshaft. A primary wobble plate, including a drive arm, is mounted on the jackshaft, and a tubular spindle is mounted in the gear case for reciprocating motion. The spindle has a longitudinal slot, and the drive arm projects through the slot where it is connected to the portion of the spindle opposite the slot on the other side of the axis of the spindle. The drive arm reciprocates the spindle as the jackshaft is rotated. A secondary wobble plate is mounted on the jackshaft, and includes a drive arm for reciprocating a counterbalance that is coaxial with the spindle, to reduce vibration.

Some hand held electric tools, such as electric screwdrivers, include clutch mechanisms that activate at a torque less than the stalling torque of the motor in the tool. For example, when a screw driven by an electric screwdriver has been driven all the way into a wall, the clutch will activate to prevent stripping of the threads. Because the clutch activates at a torque less than the stalling torque of the motor, the motor in the tool continues to rotate after the clutch has activated.

Attention is directed to U.S. patent application Ser. No. 08/275,151, filed Jul. 14, 1994, which is assigned to the assignee of the present invention, and which is incorporated herein by reference.

SUMMARY OF THE INVENTION

The inventor of the present invention has recognized that in a reciprocating saw, the saw bit occasionally locks or binds, for example if a blade encounters a knot in wood being sawed, or is otherwise overloaded. Also, the spindle of a saw occasionally hits a work piece. Either situation creates a high energy impulse of short duration on the drive mechanism of the saw. Such an impulse can cause failure to occur in the saw. For example, wobble plates may bend, or bearings may be damaged.

Such an impulse can cause failure to occur at the gear and pinion. This is the most serious type of failure, as these parts are expensive to replace.

The invention provides a reciprocating saw comprising a housing; a shaft rotatably mounted in said housing; a motor including a driving pinion adapted to rotate about an axis parallel to said shaft; a spindle reciprocally supported by said housing; a wobble plate mounted on said shaft and connected to said spindle and converting rotational motion to reciprocal motion; and a clutch drivingly connecting said motor to said shaft and providing slippage between said motor and said shaft including a clutch driver rotatably mounted on said shaft; a driven gear rotatably mounted on said shaft, adjacent said clutch driver, said driving pinion drivingly engaging said driven gear; and a spring biasing said driven gear toward said clutch driver, said spring having a predetermined spring force, said driven gear slipping relative to said clutch driver when a binding force is applied to said spindle that is greater than a binding force required to overcome said spring force.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 1:
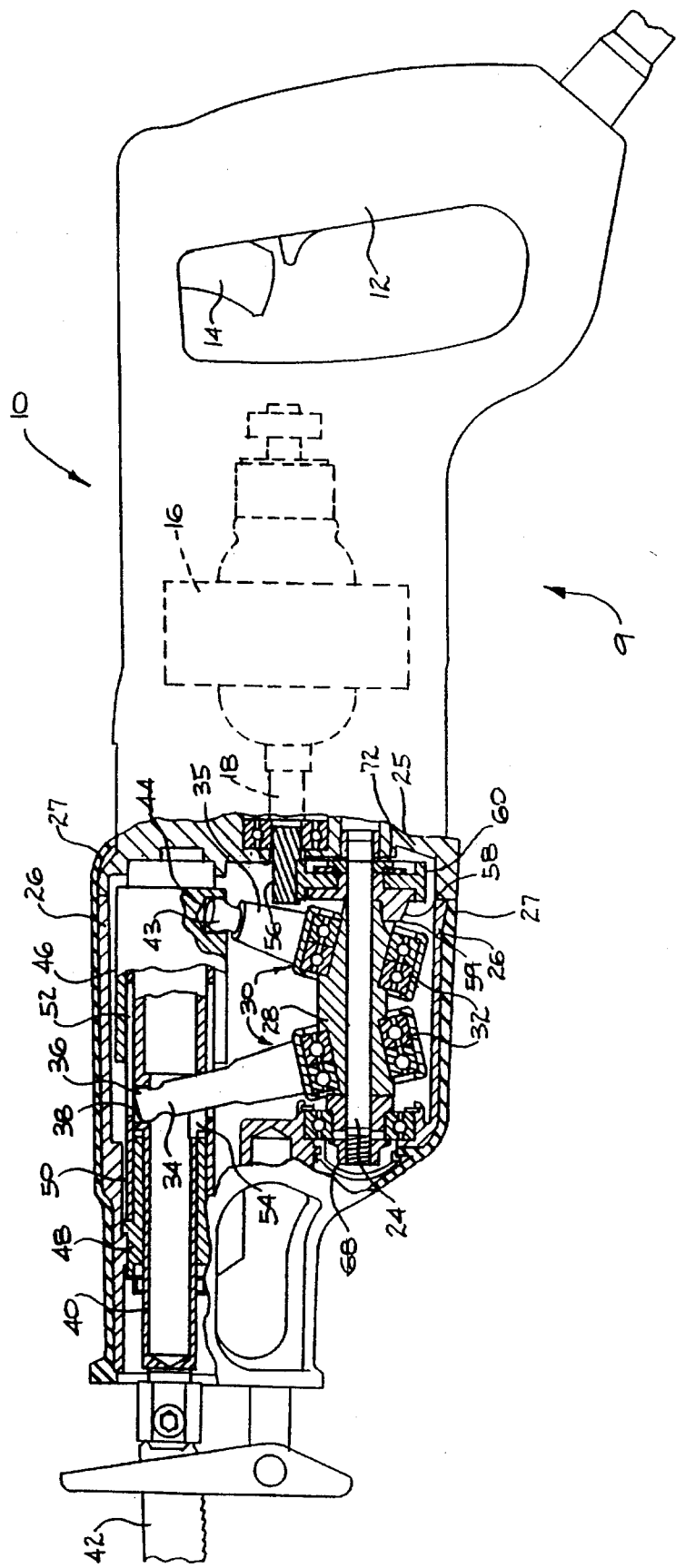
FIG. 1 is side elevational view, partly in section, of a reciprocating saw embodying various features of the invention.

Shown in the various figures is a reciprocating saw 9. The saw 9 includes a main body 10 which includes a handle portion 12. The saw 9 includes a motor 16 supported by the main body 10, and an on-off trigger switch 14 supported by the handle portion 12 and electrically connected to the motor 16 for controlling energization of the motor 16. The motor 16 includes a motor shaft 18.

The saw 9 further includes a gear case 26 and a diaphragm 25 in the main body 10, and a jackshaft 24 journaled in the gear case 26 and the diaphragm 25 and parallel to the motor shaft 18. The saw 9 further includes a urethane or rubber insulating "boot" 27 covering the gear case 26.

The saw 9 further includes means for converting rotary motion into reciprocating motion. In the illustrated embodiment, such means comprises a wobble plate drive member 28 fixed on the jackshaft 24, and two wobble plate assemblies 30 mounted on the wobble plate drive member 28. Other means can be employed for converting rotary motion into reciprocating motion. For example, the counterbalanced reciprocating mechanism described in U.S. Pat. No. 5,079,844, issued to Palm, can be employed. The wobble plate assemblies 30 convert rotary motion into reciprocating motion. Each wobble plate assembly 30 has an input bearing 32 mounted on the wobble plate drive member 28. The wobble plate assembly 30 on the left (in the figures) is a primary assembly, and the wobble plate assembly 30 on the right (in the figures) is a secondary assembly. Each wobble plate assembly 30 has a drive arm. The primary wobble plate assembly has a drive arm 34 having a somewhat spherical tip 36. The secondary wobble plate assembly has a drive arm 35 also having a somewhat spherical tip 43.

The saw 9 further includes a reciprocating tubular spindle 40 mounted in the gear case 26 for reciprocating motion and parallel to the jackshaft 24. The spindle 40 includes a socket or hole 38 receiving the spherical tip 36 of the primary wobble plate assembly 30, and the spindle 40 is reciprocated by the primary wobble plate assembly 30. The spindle 40 further includes a slot 54 in the lower portion of the spindle 40, opposite the hole 38, for receiving the drive arm 34 of the primary wobble plate assembly 30. The spindle 40 selectively carries a saw blade 42 or other tool bits, outside of the main body 10. The saw blade 42 is attached to or removed from the spindle 40 using a screw or other suitable attachment mechanism. The saw 9 further includes a reciprocating counterweight 46, mounted in the gear case 26 coaxial with the spindle 40 for reciprocation opposite to the reciprocation of the spindle 40 so as to reduce vibration. The counterweight 46 has a hole 44 receiving the spherical tip 43 of the secondary wobble plate assembly 30 and the counterweight 46 is reciprocated by the secondary wobble plate assembly 30.

The saw 9 includes a spindle bearing 48 fixed in the gear case 26. The reciprocating spindle 40 slides inside of and is guided by the spindle bearing 48. The saw 9 further includes a sleeve 50 fixed on the outside of the bearing 48. The counterweight 46 slides on the outside of the sleeve 50. The sleeve 50 has opposed slots 52, and the drive arm 34 of the primary wobble plate assembly 30 projects through the bottom slot 52 in the sleeve 50, through the slot 54 in the spindle 40, so that the tip 36 can engage the socket or hole 38 in the top of the spindle 40. The sides of the slot 54 engage a cylindrical exterior portion of the drive arm 34, and this engagement prevents the spindle 40 from rotating about the spindle axis of reciprocation.

The saw 9 further includes means drivingly connecting the motor shaft 18 to the jackshaft 24 and providing slippage between the motor shaft 18 and the jackshaft 24 if there is binding of the spindle 40, such as if the blade 42 encounters a knot or a nail in a workpiece, or the spindle 40 hits the workpiece.

Figure 2:
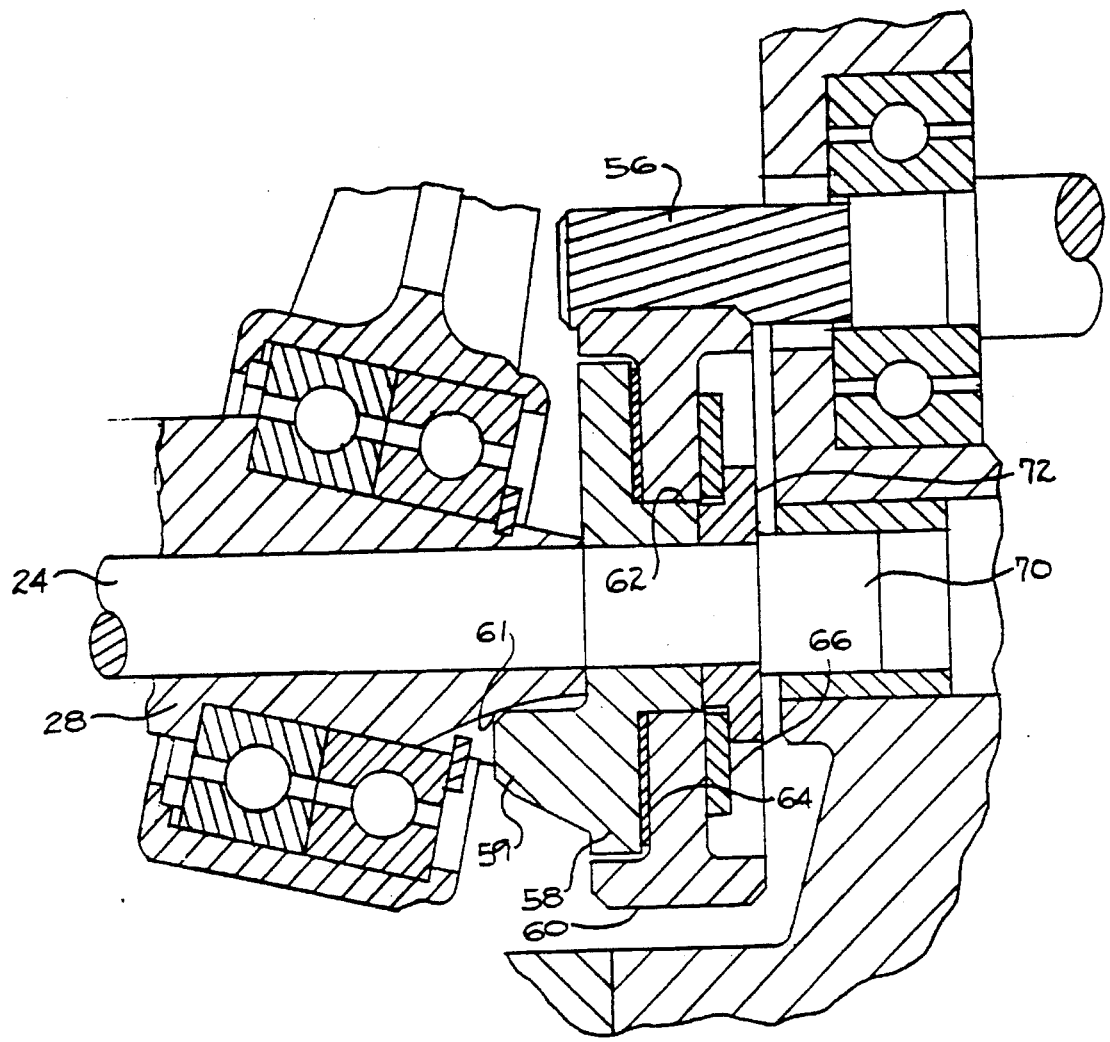
FIG. 2 is an enlarged view of a clutch mechanism included in the saw of FIG. 1.

In one embodiment of the invention, shown in FIGS. 1–2, the motor shaft 18 includes a driving pinion 56 oriented to rotate about an axis parallel to the jackshaft 24, and the means providing slippage comprises a clutch mechanism including a clutch driver 58 rotatably mounted on the jackshaft 24 and drivingly engaging the wobble plate drive member 28. More particularly, the clutch driver 58 includes a tab or projection 59 which fits in and engages a keyway 61 in the wobble plate drive member 28. The clutch mechanism further includes a driven gear 60 rotatably mounted on the jackshaft 24, adjacent the clutch driver 58. More particularly, in the embodiment shown in FIGS. 1–2, the driven gear 60 is rotatably mounted on a hub portion 62 of the clutch driver 58. The clutch driver 58 has a discoidal surface perpendicular to the jackshaft 24. The driven gear 60 has a circumference that is greater than the circumference of the clutch driver 58, and includes a discoidal surface perpendicular to the jackshaft 24 which faces the discoidal surface of the clutch driver 58. The clutch mechanism may include a clutch disk 64 located axially between the clutch driver 58 and the driven gear 60, mounted on the hub portion 62, and having a first side frictionally engaging the discoidal surface of the clutch driver 58 and having an opposite side frictionally engaging the discoidal surface of the driven gear 60.

The driving pinion 56 drivingly engages the driven gear 60. The clutch mechanism further comprises a spring 66 biasing the driven gear 60 into engagement with the clutch driver and providing slippage if there is binding of the spindle 40. In the illustrated embodiment, the spring 66 is a disk spring. The jackshaft 24 further includes an end having an enlarged diameter portion 70, and the saw 9 further includes a spring retainer 72 mounted on the jackshaft 24, against the enlarged diameter portion 70, and retaining the disk spring 66 against the driven gear 60.

The disk spring 66 controls frictional engagement of the clutch disk 64 with the driven gear 60 and clutch driver 58. If a clutch disk 64 is not used, the disk spring 66 controls frictional engagement between the driven gear 60 and the clutch driver 58. The disk spring 66 is compressed to a predetermined load setting during manufacture of the saw 9 by tightening an axle nut 68 to squeeze all the pieces mounted on the jackshaft 24, including the disk spring 66. The clutch mechanism will slip when the load on the saw spindle 40 or blade 42 exceeds the force applied by the disk spring 66. More particularly, the clutch disk 64 will slip relative to either or both of the driven gear 60 and the clutch driver 58. This prevents damage to the wobble plate assemblies 30 and the driving pinion 56 when the blade locks or binds, hits something like a knot or nail, or is otherwise overloaded.

Figure 3:
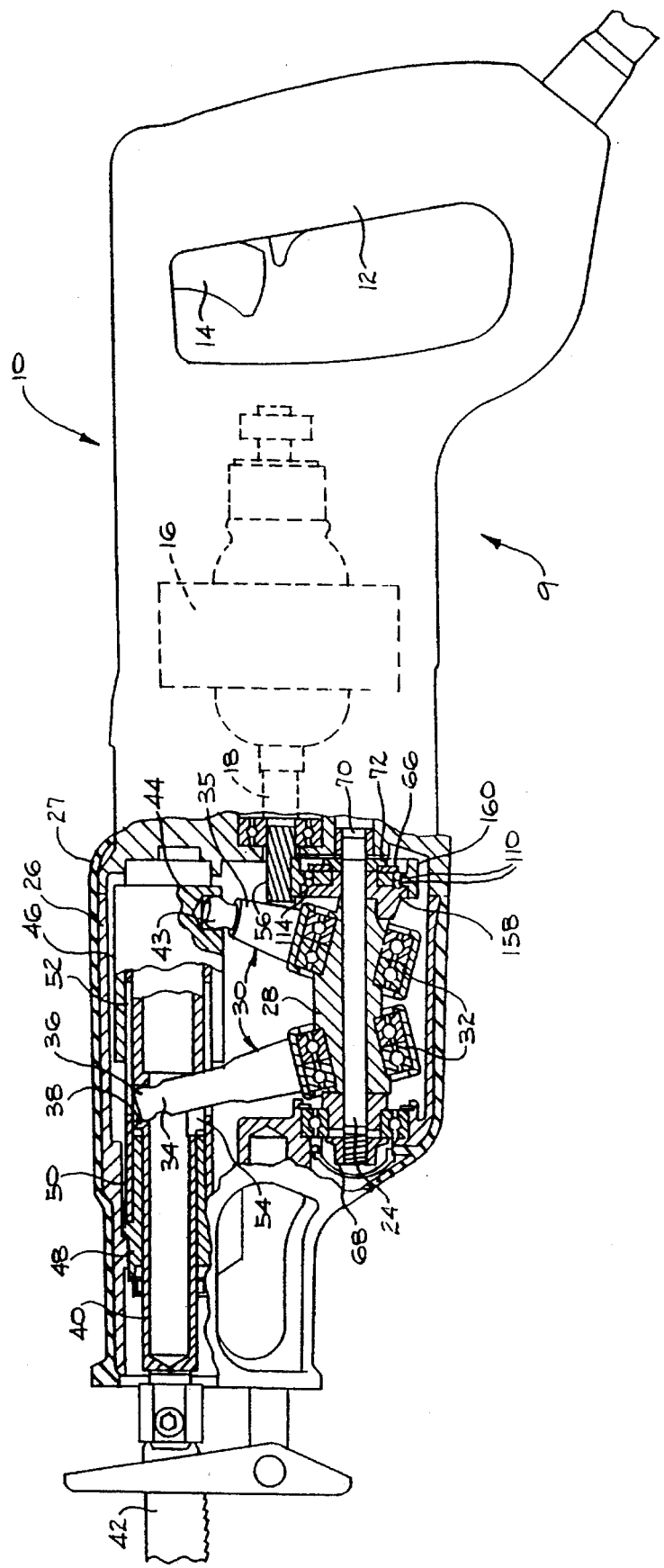
FIG. 3 is a side elevational view, partly in section, showing an alternative embodiment of the invention.
Figure 4:
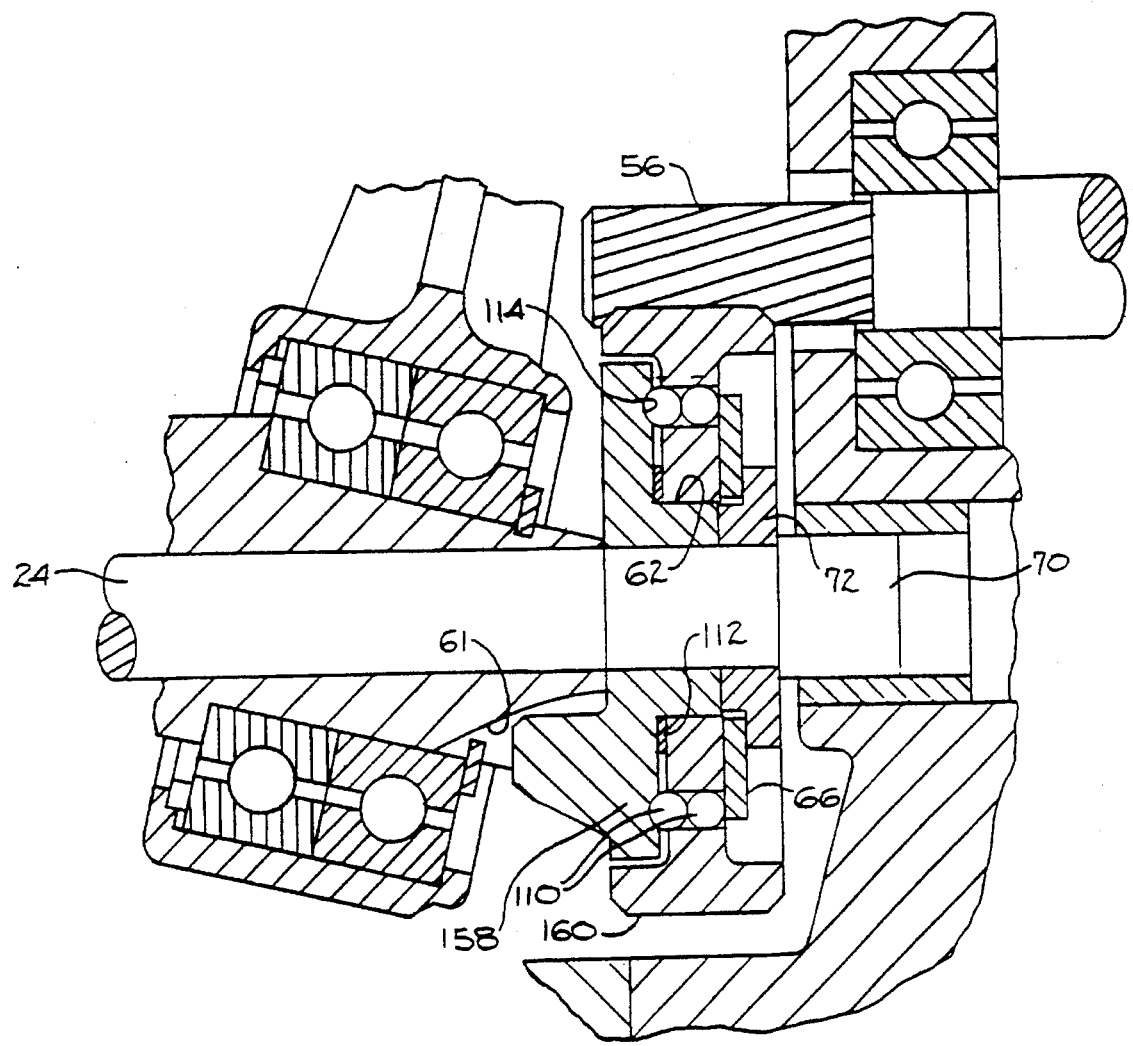
FIG. 4 is an enlarged view of a clutch mechanism included in the saw of FIG. 3.

A second embodiment of the invention is shown in FIGS. 3–4. The embodiment shown in FIGS. 3–4 is substantially identical to the embodiment of FIGS. 1–2 which was just described, like reference numerals indicating like components, except that in this embodiment, the driven gear 160 includes circumferentially spaced apertures which house ball bearings 110, and the clutch driver 158 includes a pocket or depression 114 in its side facing the driven gear 160. The ball bearings 110 are housed between, and engage, the pocket or depression 114 on one side of the driven gear 160 and the disk spring 66 on the other side of the driven gear 160. Also, in this embodiment, the clutch disk 64 is removed. A spacer 112 is provided between the clutch driver 158 and the driven gear 160 radially interior of the ball bearings 110.

By pressing against the driven gear 160 and ball bearings 110, the disk spring 66 controls engagement of the ball bearings 110 with the pocket or depression 114 in the clutch driver 158. The clutch mechanism will slip when the load on the spindle 40 or blade 42 exceeds the force applied by the disk spring 72. This prevents damage to the wobble plate assemblies 30 and the driving pinion 56 when the blade locks or binds, hits something like a knot or nail, or is otherwise overloaded.

One embodiment of the invention provides a hand held reciprocating saw including a motor, a driving shaft, a driven shaft, and a clutch in driven engagement between the driving shaft and the driven shaft, which clutch activates to provide slippage between the driving shaft and the driven shaft only at a torque higher than the stalling torque of the motor. For example, any of the clutch mechanisms disclosed above in connection with FIGS. 1–4 can be configured to slip only at a torque higher than the stalling torque of the motor. Thus, the motor stalls when the saw encounters an unexpected impediment to operation, preventing harm to the motor, and the impulse caused by the impediment is absorbed by the clutch.

While clutch mechanisms and other means providing slippage have been described in connection with a reciprocating drive mechanism that includes wobble plates, it should be understood that the clutch mechanisms and other means providing slippage can be used in reciprocating drive mechanisms that include other means for converting rotary motion into reciprocating motion. It should also be understood that the clutch mechanisms could be located at other locations in the saw; for example, a clutch mechanism can be located closer to the blade, or a clutch mechanism can be provided between slip motor shafts. The illustrated embodiment has been found to provide a more economical location for the clutch mechanism.

Modifications may be made to the preferred embodiment described and illustrated herein without departing from the spirit of the invention as expressed in the following claims.

What is claimed is:

1. A reciprocating saw comprising:

a housing;

a shaft rotatably mounted in said housing;

a motor including a driving pinion adapted to rotate about a motor axis, said motor having a stalling torque;

a spindle reciprocally supported by said housing and being reciprocatable along a spindle axis;

a wobble plate mounted on said shaft and connected to said spindle and converting rotational motion of said shaft to reciprocal motion of said spindle; and a clutch drivingly connecting said motor to said shaft, said clutch including:

a clutch driver rotatably mounted in said housing;

a driven gear rotatably mounted in said housing, adjacent said clutch driver, said driving pinion drivingly engaging said driven gear; and a spring biasing said driven gear toward said clutch driver to create a frictional force between said driven gear and said clutch driver, said driven gear slipping relative to said clutch driver when a sufficient binding force is applied to said spindle, wherein said clutch provides slippage between said motor and said shaft at a torque that is equal to or greater than the stalling torque of said motor.

2. A saw as set forth in claim 1 wherein said spring is a disk spring.

3. A saw as set forth in claim 2 wherein said shaft defines a shaft axis, and wherein said clutch driver, said driven gear, and said spring are compressed together in a direction along said shaft axis.

4. A saw as set forth in claim 1 wherein the clutch driver has a circumference and wherein said driven gear has a circumference that is greater than the circumference of said clutch driver.

5. A saw as set forth in claim 4, wherein said clutch includes a clutch disk located axially between said clutch driver and said driven gear, contacting said clutch driver and said driven gear, and providing frictional engagement between said driven gear and said clutch driver, which frictional engagement can be overcome if a sufficient binding force is applied to said spindle.

6. A saw as set forth in claim 4 further comprising a plurality of balls located axially between said clutch driver and said driven gear, contacting said clutch driver and said driven gear, and providing frictional engagement between said clutch driver and driven gear, which frictional engagement can be overcome if a sufficient binding force is applied to said spindle.

7. A saw as set forth in claim 6 wherein said clutch driver includes circumferentially spaced apart depressions receiving said balls.

8. A saw as set forth in claim 6 wherein said clutch provides slippage between said motor and said shaft at a torque that is sufficiently high to stall said motor.

9. A saw as set forth in claim 1 further comprising a guide sleeve mounted in said housing, and an axial slot in said sleeve, wherein said spindle is slidably mounted in said sleeve, wherein said wobble plate includes a drive arm, and wherein said drive arm projects through said slot in said sleeve to drivingly engage said spindle.

10. A saw as set forth in claim 9 wherein said drive arm is constrained by said slot to motion in a plane including said spindle axis and said shaft axis.

11. A saw as set forth in claim 9 further comprising a counterweight mounted on said sleeve for reciprocating motion parallel to said spindle axis and a secondary wobble plate mounted on said shaft and connected to said counterweight, wherein said wobble plates are at an angle with respect to each other and reciprocate said spindle and said counterweight in opposite directions.

12. A saw as set forth in claim 11 wherein a mass and stroke of said wobble plate and said spindle are proportioned relative to a mass and stroke of said secondary wobble plate and said counterweight so axial forces induced by reciprocation are substantially cancelled.

13. A saw as set forth in claim 1 further comprising a counterweight mounted in said housing for reciprocating motion parallel to said spindle axis and a secondary wobble plate mounted on said shaft and connected to said counterweight, wherein said wobble plates are at an angle with respect to each other and reciprocate said spindle and said counterweight in opposite directions.

14. A reciprocating saw comprising:

a housing;

a spindle reciprocally supported in said housing;

a motor operatively connected to said spindle to reciprocate said spindle, said motor having a stalling torque; and a clutch mechanism operatively positioned to provide slippage between said motor and said spindle at a slippage torque that is equal to or greater than said stalling torque of said motor.

* * * * *